United States Patent
Beeken et al.

(10) Patent No.: US 10,698,631 B2
(45) Date of Patent: Jun. 30, 2020

(54) POINT-IN-TIME COPY WITH TARGET WRITE OPTIMIZATION

(71) Applicant: INTERNATIONAL BUSINESS MACHINES CORPORATION, Armonk, NY (US)

(72) Inventors: Christopher B. E. Beeken, Eastleigh (GB); Joanna K. Brown, Winchester (GB); Carlos F. Fuente, Bishop's Waltham (GB)

(73) Assignee: International Business Machines Corporation, Armonk, NY (US)

(*) Notice: Subject to any disclaimer, the term of this patent is extended or adjusted under 35 U.S.C. 154(b) by 221 days.

(21) Appl. No.: 15/895,597

(22) Filed: Feb. 13, 2018

(65) Prior Publication Data
US 2019/0250825 A1    Aug. 15, 2019

(51) Int. Cl.
*G06F 3/06* (2006.01)
*G06F 11/14* (2006.01)

(52) U.S. Cl.
CPC .............. *G06F 3/065* (2013.01); *G06F 3/061* (2013.01); *G06F 3/0652* (2013.01); *G06F 3/0689* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 7,386,695 B2 | 6/2008 | Fuente | |
| 8,719,523 B2 | 5/2014 | Beeken et al. | |
| 8,732,419 B2 | 5/2014 | Beeken et al. | |
| 8,788,770 B2* | 7/2014 | Agombar | G06F 11/1448 711/162 |
| 9,047,233 B2 | 6/2015 | Agombar et al. | |
| 9,069,711 B2 | 6/2015 | Agombar et al. | |
| 2011/0208932 A1 | 8/2011 | Agombar et al. | |
| 2012/0246424 A1 | 9/2012 | Yuhara et al. | |

(Continued)

OTHER PUBLICATIONS

Mell et al., "The NIST Definition of Cloud Computing," National Institute of Standards and Technology, Sep. 2011, pp. 1-3, Special Publication 800-145.

*Primary Examiner* — Michael Alsip
(74) *Attorney, Agent, or Firm* — L. Jeffrey Kelly

(57) ABSTRACT

A method, computer system, and a computer program product for point-in-time copy with target write optimization in a cascading copy-on-write process is provided. The present invention may include receiving a request to perform a point-in-time copy operation to create a point-in-time copy from a source volume to a target volume. The present invention may include creating an intermediate volume, an intermediate map, and a map for the target volume. The present invention may include making the intermediate volume dependent on the source volume in a dependency chain based on the intermediate map. The present invention may include making the target volume dependent on the intermediate. The present invention may include allocating a new stream identifier to the target volume. The present invention may also include updating upstream volumes to inherit the new stream identifier as well as maintaining any existing stream identifiers.

18 Claims, 8 Drawing Sheets

(56) References Cited

U.S. PATENT DOCUMENTS

2013/0219141 A1* 8/2013 Benhase, Jr. ........... G06F 12/02
                                                        711/162
2015/0286434 A1   10/2015 Dain et al.
2017/0075773 A1*  3/2017 Beeken ................ G06F 3/0619

* cited by examiner

POINT-IN-TIME COPY WITH TARGET WRITE OPTIMIZATION

BACKGROUND

The present invention relates to computer storage systems, and more specifically, to storage with point-in-time copy with target write optimization.

In the field of computer storage systems, storage controllers manage access to a storage space comprised of numerous hard disk drives. Computer systems may communicate Input/Output (IO) requests to the storage space through the storage controller.

Point-in-time copy is a feature supported on various storage devices that allows nearly instantaneous point-in-time copies of entire logical volumes or data sets to be made. The point-in-time function enables one to make full volume copies of data, with the copies immediately available for read or write access. The copy may be used with standard backup tools that are available in a computing environment to create backup copies.

A point-in-time copy instruction starts the point-in-time copy process, which creates a map from a source volume to a target volume. The image of the source volume at this specific point in time is now available on the target volume. This creates a backup of the data on the source volume, and also allows tests and other administration tasks to be run on the data of the source volume, without the attendant danger of losing any of the original data, as it is preserved on the original source volume.

When a point-in-time copy is made, it creates a link between the two source and target volumes, as defined by the map. Data may now be copied across in the background, with the additional requirement that any access to the target volume will immediately cause the relevant parts of the image of the source volume to be copied across, and also any access to the source volume which would result in a change to the image stored by that source volume will also cause the unaltered data to be immediately copied across to the target volume. In this way, the target volume, to an outside user, stores the point-in-time copy of source volume, although data will only be physically copied across under the circumstances described above.

A storage volume that is the target volume of a point-in-time copy function can also be the source volume of a further point-in-time copy function, thus creating a cascade of storage volumes.

Some storage controllers allow a user to configure more than one target for a given source, providing a number of available applications. For instance, different experiments could be run against each of the targets. In another example, the targets might be taken at different times (e.g., different days in the week) and allow historical access to the disk, perhaps for the purpose of recovering from data corruption, such as data corruption that might be caused by a virus.

Point-in-time copy implementations achieve the illusion of the existence of a second image by redirecting read IO addressed to target volume to the source volume, unless that region has been subject to a write. When a region has been the subject of a write (i.e., to either the source or the target), in order to maintain the illusion that both source and target own their own copy of the data, a process is invoked which suspends the operation of the write command, and without it having taken effect, issues a read of the affected region from the source, applies the read data to the target with a write, then, if the previous steps were successful, releases the suspended write. Subsequent writes to the same region do not need to be suspended since the target will already have its own copy of the data. This copy-on-write technique is well known and is used in many environments.

SUMMARY

According to an aspect of the present invention there is provided a computer-implemented method for point-in-time copy with target write optimization in a cascading copy-on-write process. The present invention may include, in response to receiving, using a processor of a computer, a request to perform a point-in-time copy operation to create a point-in-time copy from a source volume to a target volume. The present invention may also include creating an intermediate volume, an intermediate map, and a map for the target volume. The present invention may then include making the intermediate volume dependent on the source volume in a dependency chain based on the intermediate map. The present invention may further include making the target volume dependent on the intermediate volume in the dependency chain based on the map for the target volume. The present invention may include allocating a new stream identifier to the target volume, wherein stream identifiers represent dependent branches in cascading copy-on-write volumes. The present invention may also include updating upstream volumes to inherit the new stream identifier as well as maintaining any existing stream identifiers.

According to a further aspect of the present invention there is provided a system for point-in-time copy with target write optimization in a cascading copy-on-write process, comprising a processor and a memory configured to provide computer program instructions to the processor to execute the function of the components. The present invention may include a point-in-time copy component for performing a point-in-time copy operation including, a target component for creating a point-in-time copy from a source volume to a target volume, a target component for creating a target volume, an intermediate component for creating an intermediate volume, an intermediate map component for creating an intermediate map, and a map component for creating a map for the target volume, wherein the intermediate volume is dependent on the source volume in a dependency chain based on the intermediate map, and the target volume is dependent on the intermediate volume in the dependency chain based on the map of the target volume. The present invention may also include a point-in-time copy component further including a stream identifier component for allocating a new stream identifier to the target volume, wherein stream identifiers represent dependent branches in cascading copy-on-write volumes, and an upstream updating component for updating upstream volumes to inherit the new stream identifier as well as maintaining any existing stream identifiers.

According to a further aspect of the present invention there is provided a computer program product for point-in-time copy with target write optimization in a cascading copy-on-write process, the computer program product comprising a computer readable storage medium having program instructions embodied therewith, the program instructions executable by a processor to cause the processor to, in response to receiving a request to perform a point-in-time copy operation to create a point-in-time copy from a source volume to a target volume, create an intermediate volume, an intermediate map, and a map for the target volume. The present invention may also include making the intermediate volume dependent on the source volume in a dependency chain based on the intermediate map. The present invention may then include making the target volume dependent on the intermediate volume in the dependency chain based on the map for the target volume. The present invention may further include allocating a new stream identifier to the target volume, wherein stream identifiers represent dependent branches in cascading copy-on-write volumes. The present invention may also include updating upstream volumes to inherit the new stream identifier as well as maintaining any existing stream identifiers.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings. Preferred embodiments of the present invention will now be described, by way of example only, with reference to the following drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system provide point-in-time copy with target write optimization. Input/Output (IO) streams are used in copy-on-write cascaded volumes that separate the dependency chain into the different branches of a tree. By introducing the concept of IO stream identifiers, a modification to the copy-on-write cascade algorithm reduces the target write amplification. The sub-chain generated when creating point-in-time copies, clones, or backups of existing backups and clones, may be extracted in a way that is natural to a user's perception of the objects they have created.

Figure 1:
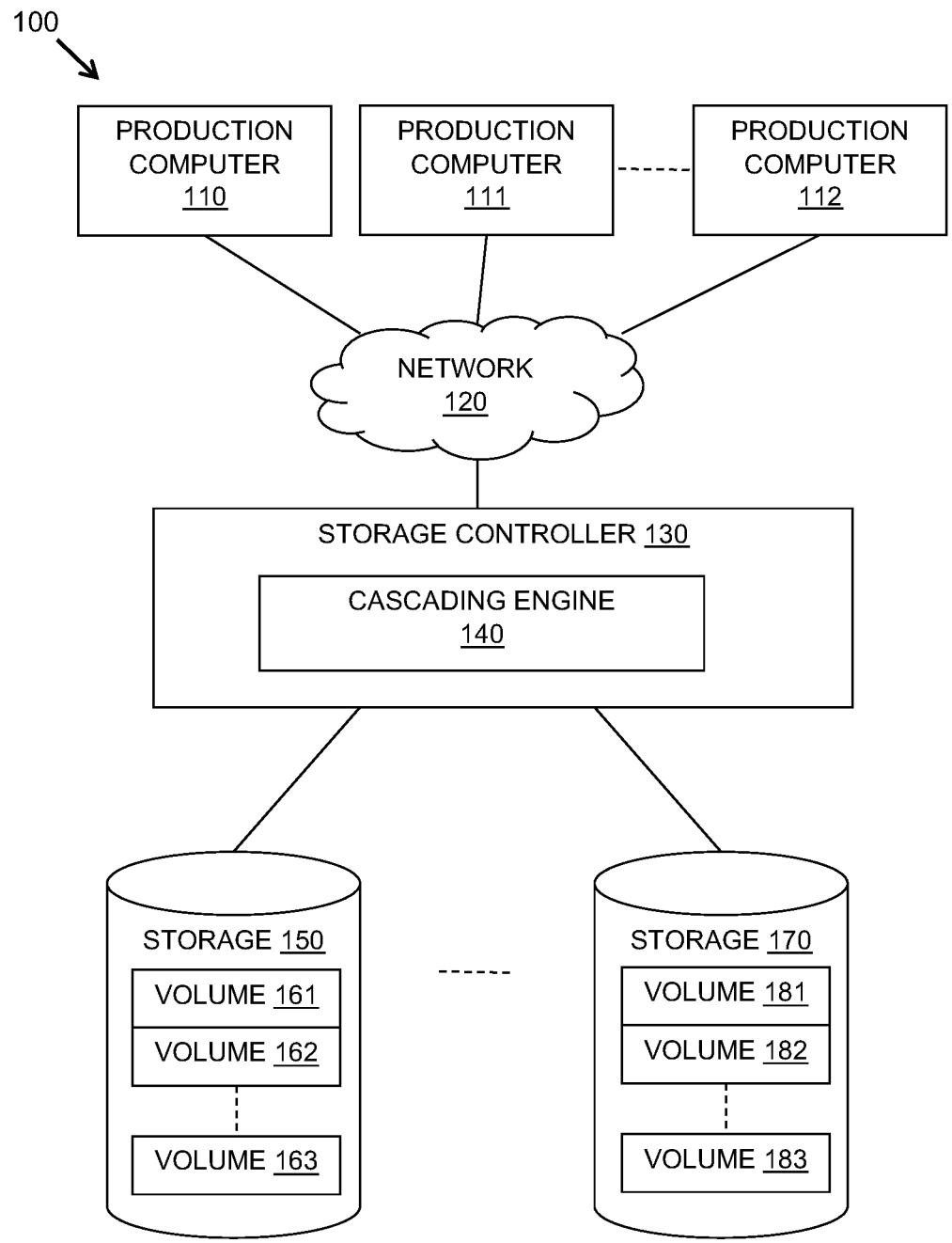
FIG. 1 is a schematic diagram of a storage system in which the present invention may be implemented.

FIG. 1 is a block diagram illustrating a computing environment of a storage system 100. A storage controller 130 receives IO requests from production computers 110, 111, 112 over a network 120 directed toward storage 150, 170 configured to have volumes (e.g., Logical Unit Numbers, Logical Devices, etc.) 161, 162, 163 and 181, 182, 183, respectively. The storage 150, 170 may be storage devices, such as direct access storage devices (DASD).

The storage controller 130 further includes a cascading engine 140. The cascading engine 140 performs point-in-time copies of data (e.g., from a production computer 110, 111, 112) to storage 150, 170 or between storage 150, 170. In certain embodiments, the cascading engine 140 may be executed at another storage controller connected to storage controller 130 instead of, or in addition to, execution at the storage controller 130.

A volume may be any logical or physical element of storage. In certain embodiments, the data blocks are contents of tracks, while the sub-data blocks are contents of sectors of tracks. A volume may be divided into blocks of storage containing data blocks (i.e., blocks of data), and the blocks of storage may further be divided into sub-blocks of storage that contain sub-data blocks (i.e., sub-blocks of data).

Embodiments are applicable to the transfer of data between any storage mediums. For example, certain embodiments may be used with storage mediums located at a single storage controller, as illustrated in FIG. 1, whilst other embodiments may be used with storage mediums located at different storage controllers or different physical sites. Each storage device may be a source or a target for a point-in-time copy.

In certain embodiments, removable storages, for example instead of or in addition to storage 150, 170, may be used to maintain copies. The removable storages may reside at the storage controller 130.

The storage controller 130 may further include a processor complex and may comprise any storage controller or server known in the art.

The production computers 110, 111, 112 may comprise any computing device known in the art. The storage controller 130 and production computer system(s) 110, 111, 112 communicate via a network 120, which may comprise any type of network, such as, a Storage Area Network (SAN), a Local Area Network (LAN), a Wide Area Network (WAN), the Internet or an Intranet. The storage 150, 170 may each comprise an array of storage devices, such as Direct Access Storage Devices (DASDs), Just a Bunch of Disks (JBOD), Redundant Array of Independent Disks (RAID) or a virtualization device.

Additionally, although FIG. 1 illustrates a single storage controller 130, one skilled in the art would know that multiple storage controllers may be connected via a network (e.g., a Local Area Network (LAN), Wide Area Network (WAN) or the Internet), and one or more of the multiple storage controllers may implement the described system.

A storage volume that is the target volume of a point-in-time copy function can also be the source volume of a further point-in-time copy function, thus creating a cascade of storage volumes. The cascading engine 140 performs a cascaded approach by creating dependencies between target volumes in order to minimize overhead.

Implementations of point-in-time rely on a data structure that governs the decisions discussed above, namely, the decision as to whether reads received at the target are issued to the source or the target, and the decision as to whether a write must be suspended to allow the copy-on-write to take place. The data structure essentially tracks the regions or grains of data that have been copied from source to target, as distinct from those that have not. In its simplest form, the data structure is maintained in the form of a bitmap showing which grains have been written to, and which are untouched by write activity.

U.S. Pat. No. 7,386,695 B2, as incorporated by reference herein, describes a cascaded configuration of storage volumes including implementing point-in-time copy functionality that optimizes source writes at the expense of target IO. Many point-in-time copies of a single volume may be performed with the cost being independent of the number of such copies by modifying the standard copy-on-write (COW) algorithm to allow chaining of related point-in-time copies. This modification to a basic COW algorithm is referred to herein as the point-in-time cascading COW algorithm.

Point-In-Time Cascading COW Algorithm

This approach works by modifying the source of any existing point-in-time map when a new point-in-time map is started, an existing point-in-time map using the source volume as its own volume is modified to use the target volume of the new point-in-time as its source volume. For example, suppose there is a production volume P and a point-in-time is created/started of P onto volume $B_1$, then there is provided a chain or cascade:

P→$B_1$.

In this cascade P is the source and $B_1$ is the target. In this case P is also referred to as the effective source of the P→$B_1$ map. Now suppose they want to also want to create/start a point-in-time onto volume $B_2$ then the chain becomes:

P→$B_2$→$B_1$

So now map P→$B_1$ has effective source volume $B_2$. This transformation is valid because $B_2$ is an exact copy of P at this point in time.

In order to maintain the images the basic IO COW algorithm must be modified. See below for read IO changes and write IO changes.

Read IO Changes

1. Read $B_1$: If data held on $B_1$ read $B_1$ else, if data on $B_2$ read $B_2$ else read P.

2. Read $B_2$: If data on $B_2$ read $B_2$, else read P.

3. Read P: Read P.

Write IO Changes

1. Write to $B_1$: Write to $B_1$

2. Write to $B_2$: If $B_1$ needs data held on P, then read P and write result to $B_1$, then write to $B_2$.

Else if $B_1$ needs data held on $B_2$, then read $B_2$ and write result to $B_1$, then write to $B_2$.

Else Write to $B_2$.

3. Write to P: If $B_2$ needs data held on P then read P and write result to $B_2$ then write to P.

Else write to P.

These modifications enable multiple point-in-time map targets to be chained which means that a single write to P can result in at most 1 extra write to a target volume irrespective of the number of target volumes from P. Thus, the impact of the point-in-time maps on the source/production IO performance is minimized and, more importantly, bounded.

There are two challenges to the point-in-time cascading COW algorithm. The first challenge is target dependency cleaning. This chaining approach has created a dependency between the target volumes. In the example above, $B_1$ is dependent on $B_2$. Therefore, if $B_2$ needs to be removed from the chain without losing $B_1$, then all the data on $B_2$ that is needed (i.e., required for host reads) by $B_1$, must first be copied to $B_1$. This process is referred to as cleaning.

The second challenge is increased target write amplification. This approach has created a dependency between the target volumes. This means that a write to a target volume, for example, $B_2$ will result in a write to $B_1$. This means that writes to individual targets results in IO to targets that are only related through having a common source volume.

Mixing Point-In-Time Types

The challenges mentioned above become particularly difficult when considering the different use-cases that point-in-time is used to address. There are three primary use cases:

1. Snapshot: This is a point-in-time copy of a source volume that is not intended to be independent of the source. It is generally used for recovery of the source in the event of data corruption. There will be no background copy process and the target volume is often thinly provisioned to save back-end storage. There are often many snapshots of a single source existing concurrently so minimizing the storage requirement is an important feature.

2. Clone: This is a point-in-time copy of a source that is intended to be independent of the source and remain independent for its lifetime. It is generally used when a copy is needed and IO to the copy must not impact the IO to the source in anyway. A clone may also be used when it is important that the copy is not affected by availability of the source.

3. Backup: This is a point-in-time copy of a source that is intended to be independent of the source. It is similar to the clone, but the point-in-time copy can be refreshed. While it is being refreshed it becomes dependent on the source again, and so the refresh time needs to be minimized to reduce the dependency time of the target volume on the source volume.

For snapshots, target IO is not expected in significant quantities, therefore, the challenge of increased target write amplification is not significant until the different types are mixed. Clones and backups can expect far higher quantities of IO and this means that any snapshots can be greatly affected by the existence of clones or backups.

Figure 2:
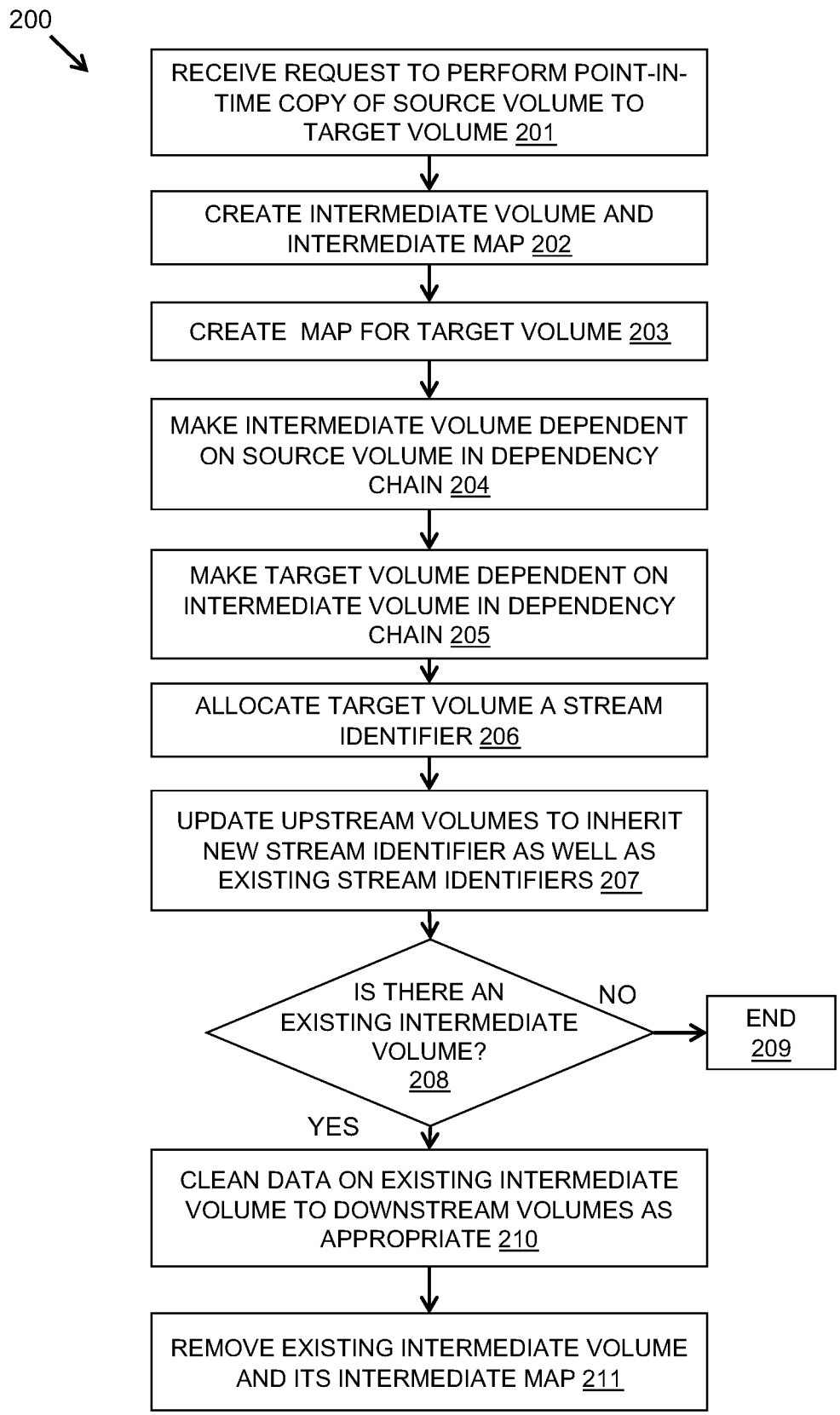
FIG. 2 is a flow diagram of an example embodiment of an aspect of a method in accordance with the present invention.

Referring to FIG. 2, a flow diagram 200 shows an example embodiment of the described method of providing point-in-time copy with target write optimization. IO streams are used in COW cascaded volumes that separate the dependency chain into the different branches of a tree.

A request to perform a point-in-time copy operation to create a point-in-time copy from a source volume to a target volume is received 201. In response to receiving the request, creating 202 an intermediate volume and an intermediate map and creating 203 a map for the target volume. The intermediate volume may be a thinly provisioned volume that cannot be accessed directly. The intermediate volume acts as a staging buffer that will catch COW data.

The intermediate volume is made 204 dependent on the source volume in a dependency chain based on the intermediate map and the target volume is made 205 dependent on the intermediate volume in the dependency chain based on the map.

The method allocates 206 the target volume a new stream identifier and upstream volumes are updated 207 to inherit the new stream identifier as well as existing stream identifiers. The stream identifiers represent dependent branches in a linear chain of COW volumes.

In one embodiment, the stream identifiers are in the form of prime numbers and exiting stream identifiers are multiples of previously used prime number. Updating an upstream volume to inherit a stream identifier as well as existing stream identifiers multiplies the exiting stream identifier by the new prime number resulting in an updated stream identifier having prime factors of the stream identifiers to which it belongs.

In another embodiment, stream identifiers may be recorded in a bit vector.

The method may extend to a cleanup operation by determining 208 if there is an existing intermediate volume in the chain. If there is no existing intermediate volume, the method may end 209. However, if there is an existing intermediate volume, the data on the existing intermediate volume may be cleaned 210 to downstream volumes as appropriate and the existing intermediate volume and its intermediate map may be removed 211.

A worked example of a first embodiment is described below using the prime number method for stream identifiers.

Suppose there are volumes A, A', A" and A'" and point-in-time copy maps:
1: A→A'
2: A A"
3: A→A'"
where 1) is snapshot and 2) and 3) are clones (or backups).

Start map 1) to get dependency chain:
A→A'

In this case, significant write IO to A' are not expected, so this proceeds in the normal way using the algorithms described above. Additionally, a stream identifier is added, which will be used as the example progresses. In this embodiment, the stream identifiers are represented by prime numbers; however, a bit vector implementation may be used. These stream identifiers are used to track the flow of IO down the branches of the graph of point-in-time copy maps and help identify interlocking branches of a graph.

The first identifier is "2" (i.e., being the first prime number) and the first identifier is represented in the chain by:
A(2)→A'(2)
which means that volumes A and A' belong to stream "2".

Now map 2) is started and, in this case, write IO to A" are expect and so first a snapshot A→B' is created where B' is a thinly provisioned volume that cannot be accessed directly. The volume B' will act as a staging buffer that will catch copy-on-write data from A, so it can be later be copied to A' and A", if needed. This maintains the benefit of bounded costs of writes to A as provided in U.S. Pat. No. 7,386,695 B2. These maps are started to get chain:
A(6)→B'(6)→A"(3)→A'(2)

Here, "3" is the new stream identifier for A" (i.e., the next prime number). All volumes upstream of A" inherit this new identifier, that is B' and A now have prime factors "3" and "2" meaning the stream identifier is "6".

As mentioned above the identifier is used to identify separate branches of the point-in-time copy tree, even though they are arranged as a linear cascade. In this example implementation, prime factors are used to identify the leaves of the tree and where they combine at the trunk. The stream identifier is used to modify the IO processing.

Now at map 3) a new snapshot A→B" is created where B" is a thinly provisioned volume that cannot be accessed directly. These maps are started to get chain:
A(30)→B"(30)→A'"(5)→B'(6)→A"(3)→A'(2)

The new stream identifier is "5" (the next prime number) which again modifies the stream identifiers upstream. In addition, the previous temporary snapshot A→B' is stopped. This will clean any data on B' to A" and A' as appropriate.

Once cleaned, this map is removed from the chain and deleted, giving chain:
A(30)→B"(30)→(5)→A"(3)→A'(2)

It can be seen that this chain of point-in-time copy maps represents a tree structure with the trunk being stream "30" and the branches being represented by streams "2", "3" and "5".

A worked example of a second embodiment is described below using the bit vector method for stream identifiers.

The bit vector approach uses an array of bits to describe branches of a graph. For example, suppose there is a graph with nodes A, B, C, D, E, F and G and the following branches:
A→B
A→E
B→D
B→E
E→F
E→G A simple bit vector scheme may be used where the bits in vector represent the nodes, (A,B,C,D,E,F,G). In such a scheme the bit vector for the above graph would be:
A=(1,0,0,0,0,0,0)
B=(1,1,0,0,0,0,0)
C=(1,1,1,0,0,0,0)
D=(1,1,0,1,0,0,0)
E=(1,0,0,0,1,0,0)
F=(1,0,0,0,1,1,0)
G=(1,0,0,0,1,0,1)

This enables the method to identify quickly whether a node belongs to a branch.

The prime number approach may provide advantages over the bit vector approach for relatively small number of branches (e.g., up to 256) in particular when considering how much space is required to store the branch identifier. Once a larger numbers of branches is reached, the space required to store the branch identifiers may become a problem because multiplying primes may result in the space requirement becoming impractical.

Figure 3:
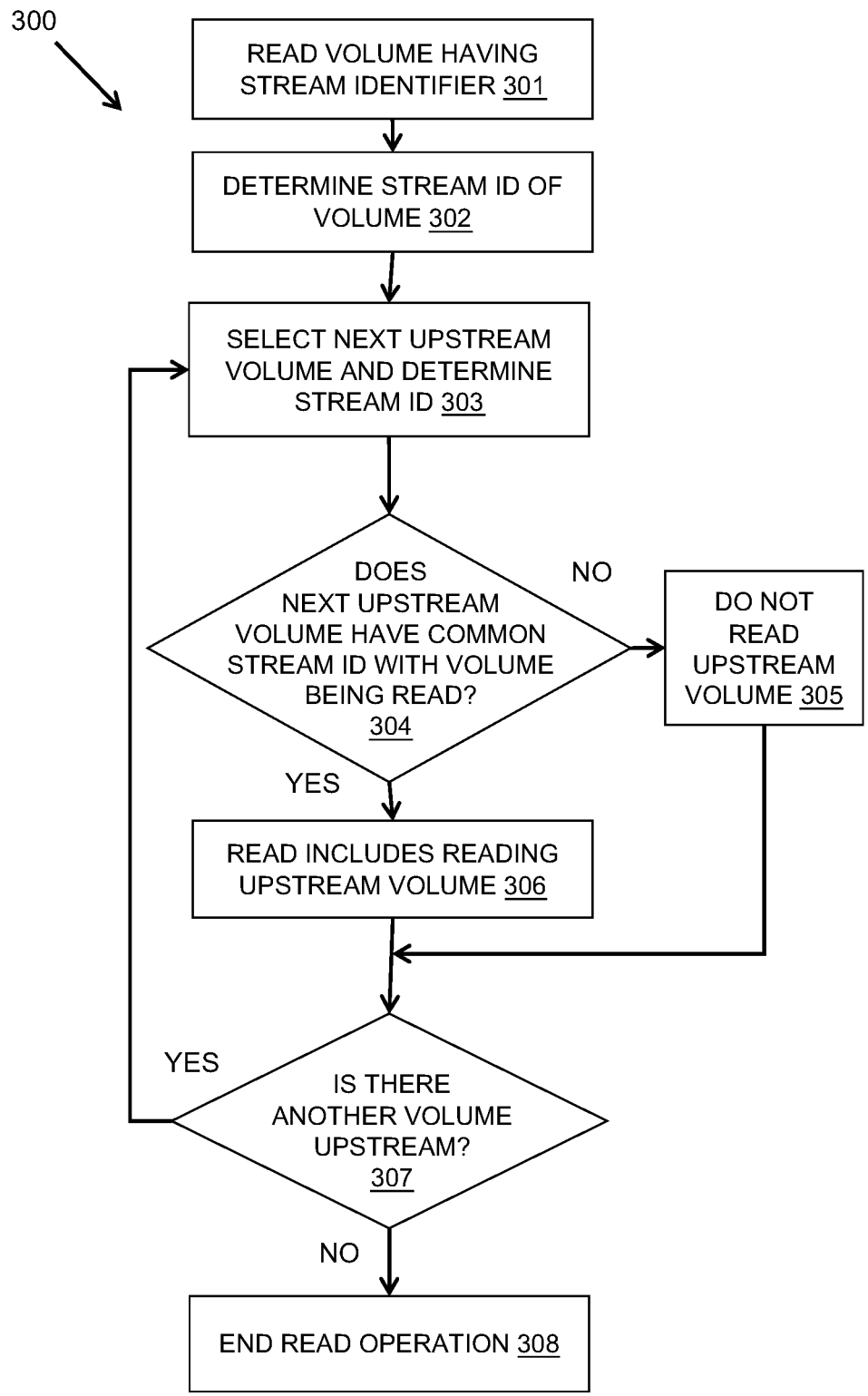
FIG. 3 is a flow diagram of an example embodiment of a further aspect of a method in accordance with the present invention.

Referring to FIG. 3, a flow diagram 300 shows an example embodiment of an aspect of the described method of providing point-in-time copy with target write optimization in the context of a read operation.

A read may be made 301 to a volume in a chain having stream identifiers. The stream identifier of the volume being read may be determined 302.

The next upstream volume in the chain may be selected 303 and the stream identifier of that volume determined. It may be determined 304 if the upstream volume has a common stream identifier with the volume being read.

In the described embodiment in which stream identifiers are prime numbers, a common stream identifier may be a stream identifier having factors of the prime number of the volume being read.

In the described embodiment in which stream identifiers are provided by a bit vector, the bit vector of the upstream volume may be checked to see if it includes the stream identifier of the volume being read.

If the upstream volume does not have a common stream identifier with the volume being read, the upstream volume is not read 305 in the read operation. However, if the upstream volume does have a common stream identifier with the volume being read, the read operation includes 306 reading the upstream volume.

It both cases, it may then be determined 307 if there is another volume upstream. If there are no further volumes upstream, the read operation may end 308. If there are further volumes upstream, the read operation may loop to select 303 the next upstream volume and determine the stream identifier.

Therefore, for read IO only upstream volumes are considered for read if the stream identifiers have a common identifier with the stream identifier of the volume being read.

In the example above, this means a read of A' will only consider A and B' because stream identifiers of "2" and "6"

have "2" in common. Similarly, a read of A" will only consider A and B' because stream identifiers of "3" and "6" have "3" in common.

Figure 4:
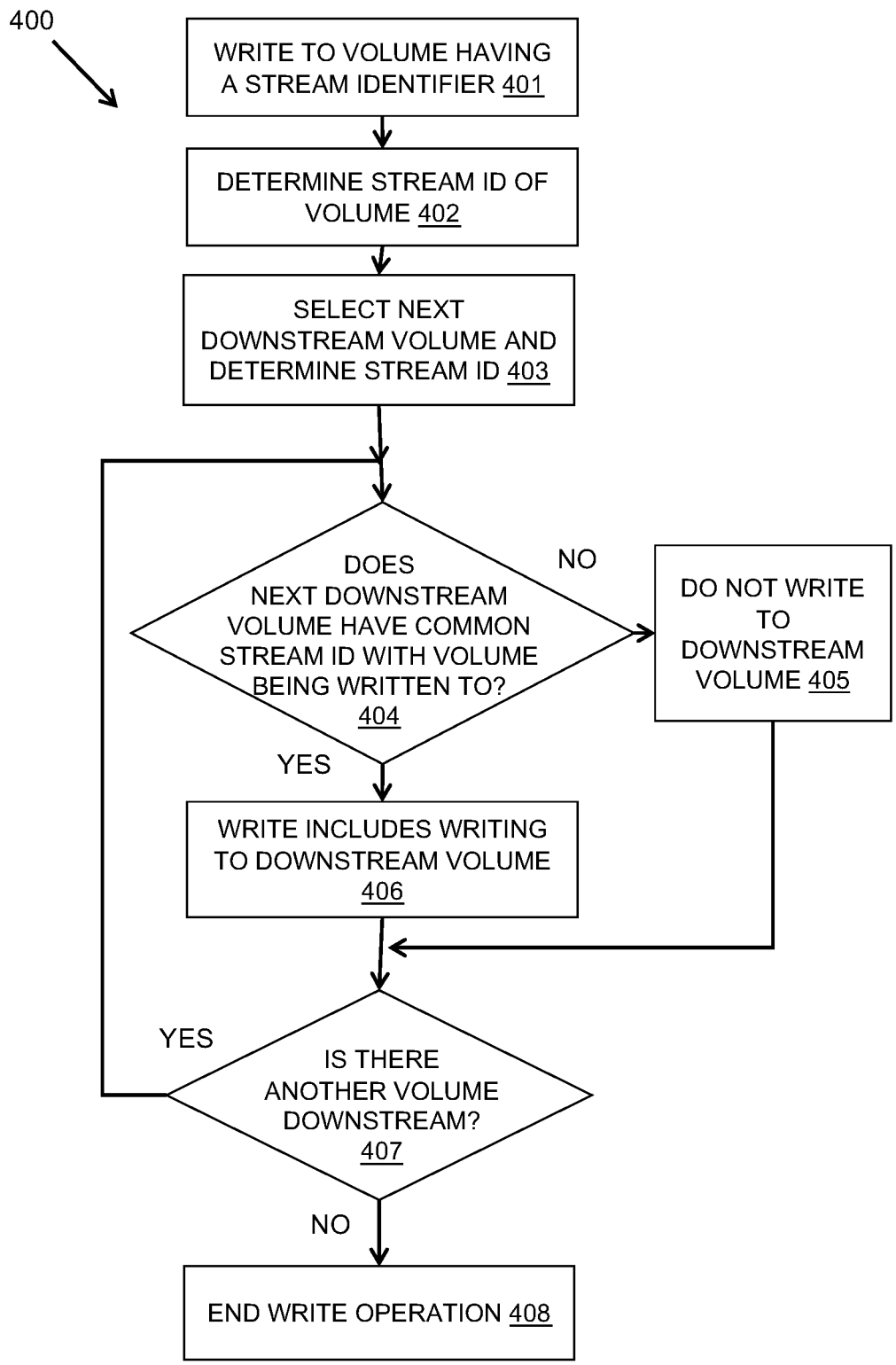
FIG. 4 is a flow diagram of an example embodiment of a further aspect of a method in accordance with the present invention.

Referring to FIG. 4, a flow diagram 400 shows an example embodiment of an aspect of the described method of providing point-in-time copy with target write optimization in the context of a write operation.

A write may be made 401 to a volume in a chain having stream identifiers. The stream identifier of the volume being written to may be determined 402.

The next downstream volume in the chain may be selected 403 and the stream identifier of that volume determined. It may be determined 404 if the downstream volume has a common stream identifier with the volume being written to.

In the described embodiment in which stream identifiers are prime numbers, a common stream identifier may be a stream identifier having factors of the prime number of the volume being read.

In the described embodiment in which stream identifiers are provided by a bit vector, the bit vector of the upstream volume may be checked to see if it includes the stream identifier of the volume being read.

If the downstream volume does not have a common stream identifier with the volume being written to, the downstream volume is not written to 405 in the write operation. However, if the downstream volume does have a common stream identifier with the volume being written to, the write operation includes 406 writing to the downstream volume.

It both cases, it may then be determined 407 if there is another volume downstream. If there are no further volumes downstream, the write operation may end 408. If there are further volumes downstream, the write operation may loop to select 403 the next downstream volume and determine the stream identifier.

For write IO the algorithm is adjusted in a similar way as with the read operation. In the example given above, A write to A" would not result in write to A' because "2" and "3" have no common factors.

Figure 5:
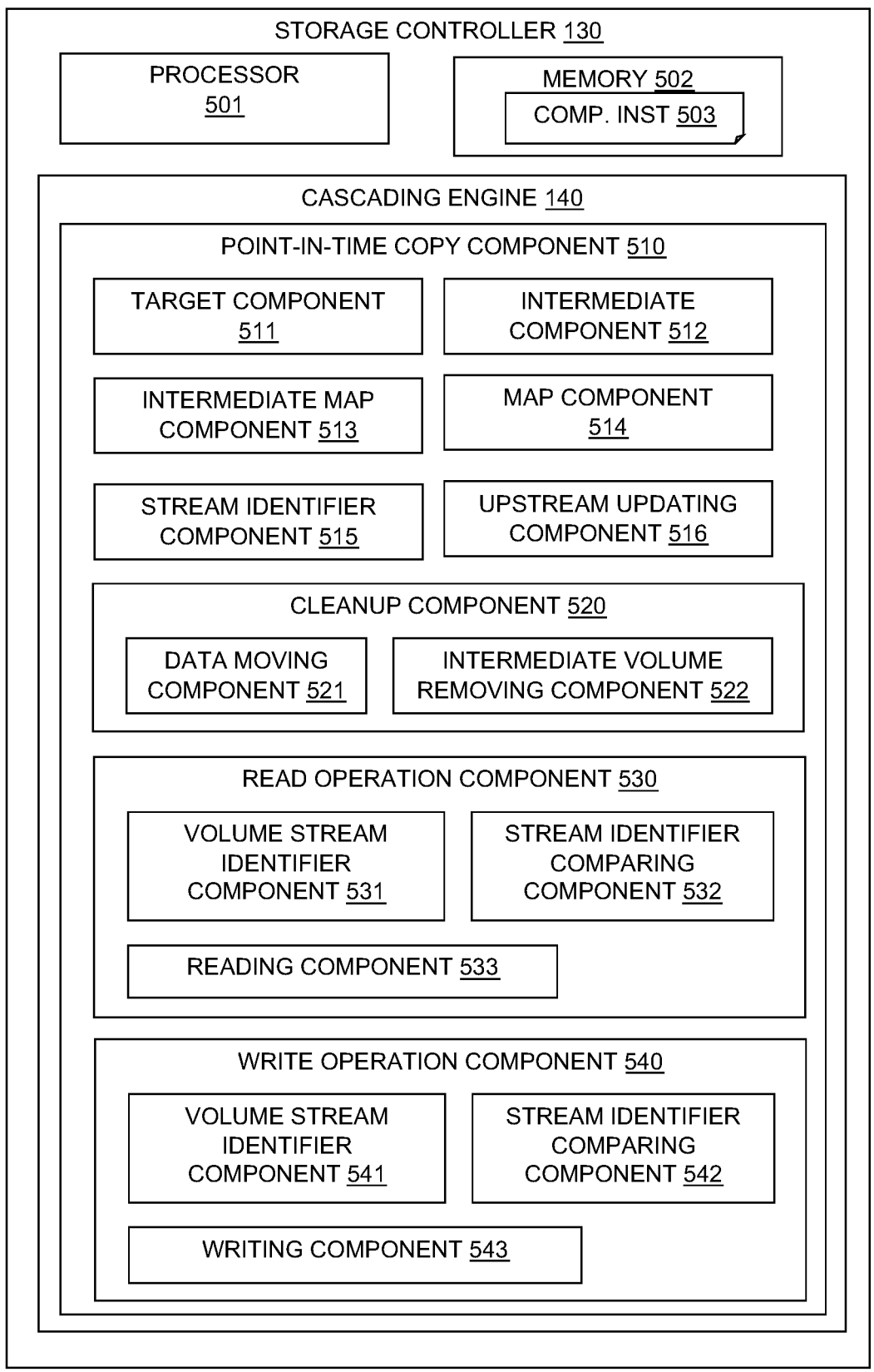
FIG. 5 is block diagram of an example embodiment of a system in accordance with the present invention.

Referring to FIG. 5, a block diagram shows an example embodiment of a storage controller 130 having a cascading engine 140 including a point-in-time copy component 510 with target write optimization in a cascading copy-on-write process as described herein.

The storage controller 130 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The point-in-time copy component 510 for performing a point-in-time copy operation may include: a target component 511 for creating a point-in-time copy from a source volume to a target volume; an intermediate component 512 for creating an intermediate volume; an intermediate map component 513 for creating an intermediate map; and a map component 514 for creating a map for the target volume.

The point-in-time copy component 510 may include a stream identifier component 515 for allocating a new stream identifier to the target volume in which stream identifiers represent dependent branches in cascading copy-on-write volumes. The point-in-time copy component 510 may include an upstream updating component 516 for updating upstream volumes to inherit the new stream identifier as well as existing stream identifiers.

The point-in-time copy component 510 may include a cleanup component 520 for cleaning up an existing intermediate volume in the cascading copy-on-write process, including: a data moving component 521 for cleaning data on an existing intermediate volume to downstream volumes; and an intermediate volume removing component 522 for removing an existing intermediate volume and its intermediate map.

The point-in-time copy component 510 may include a read operation component 530 for carrying out a read operation to a volume in the cascading copy-on-write volumes, including: a volume stream identifier component 531 for determining the stream identifier of the volume being read and of upstream volumes; a stream identifier comparing component 532 for comparing the stream identifier of the volume being read to the stream identifier of each upstream volume; and a reading component 533 for including the upstream volume in the read operation if the upstream volume has a common stream identifier with the volume being read.

The point-in-time copy component 510 may include a write operation component 540 for carrying out a write operation to a volume in the cascading copy-on-write volumes, including: a volume stream identifier component 541 for determining the stream identifier of the volume being written to and of downstream volumes; a stream identifier comparing component 542 for comparing the stream identifier to the stream identifier of each downstream volume; and a writing component 543 for including the downstream volume in the write operation if the downstream volume has a common stream identifier with the volume being written to.

The described method and system using stream identifiers in a point-in-time copy functions of storage systems reduce target write amplification by enabling multiple logical dependency chains within a single copy-on-write dependency chain.

Figure 6:
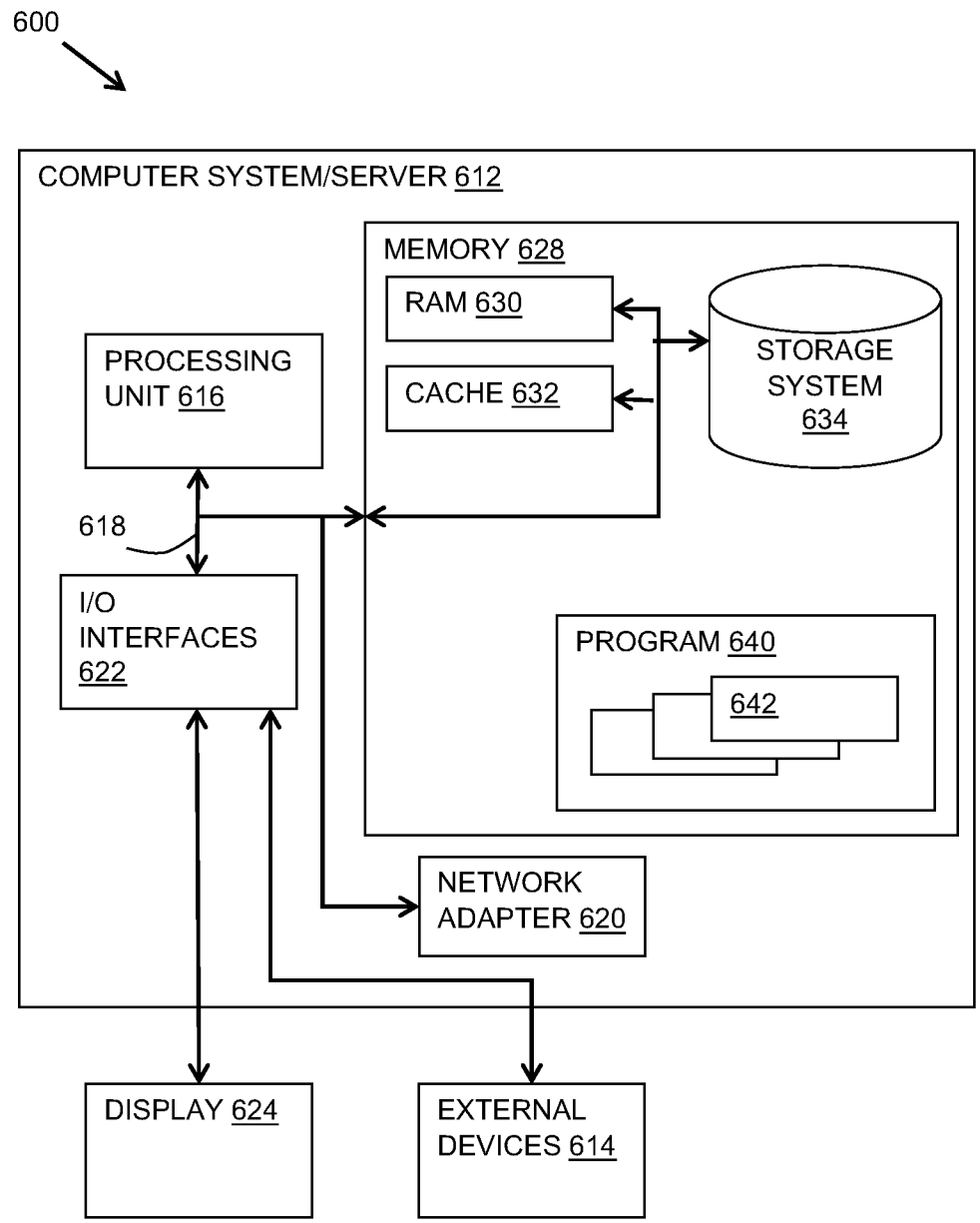
FIG. 6 is a block diagram of an embodiment of a computer system or cloud server in which the present invention may be implemented.

Referring now to FIG. 6, a schematic of an example of a system 600 in the form of a computer system or server is shown.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
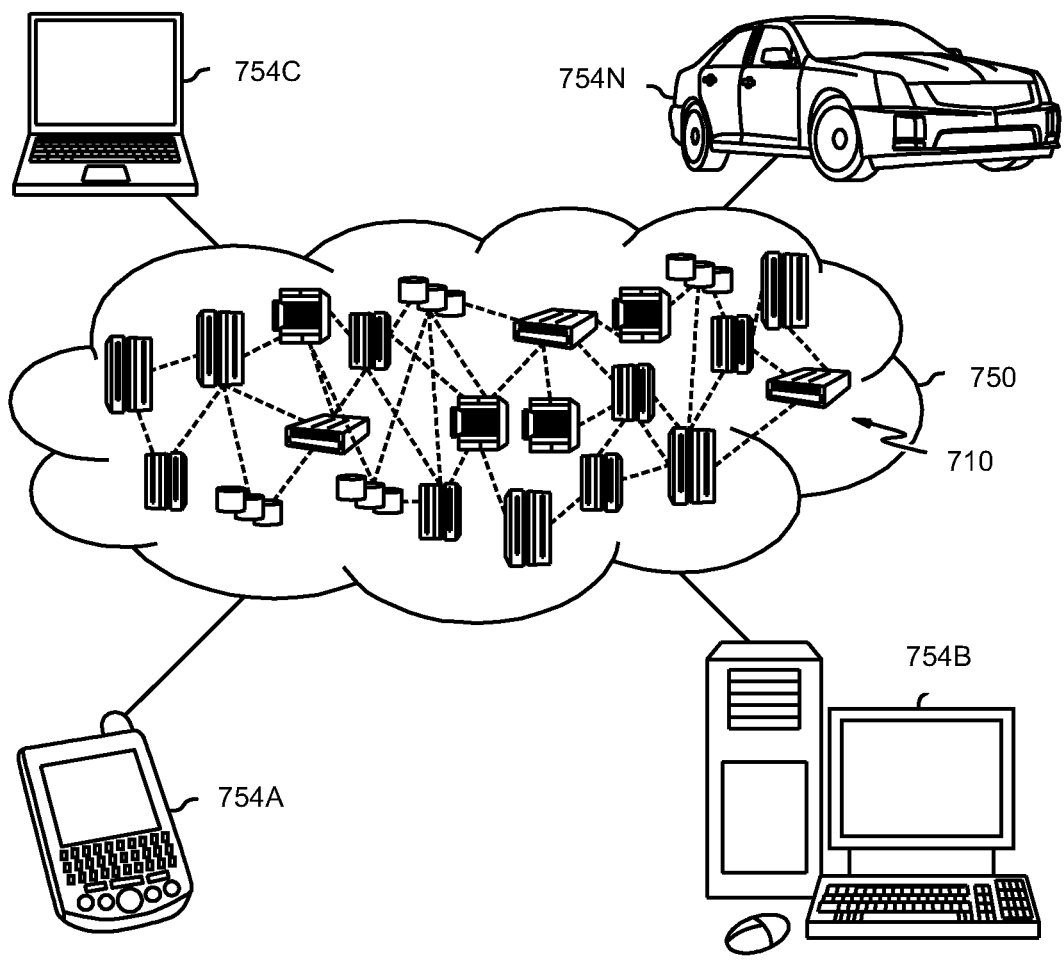
FIG. 7 is a schematic diagram of a cloud computing environment in which the present invention may be implemented.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
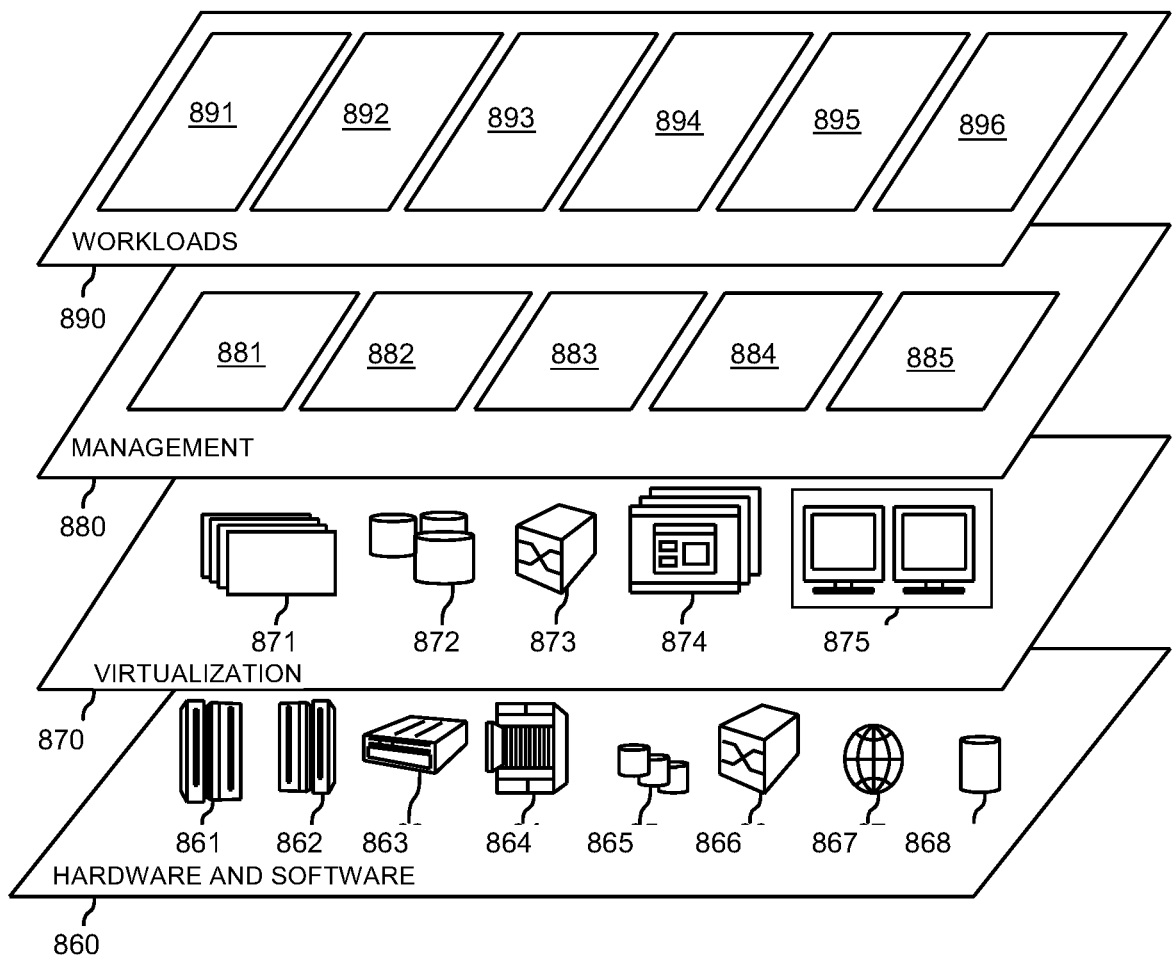
FIG. 8 is a diagram of abstraction model layers of a cloud computing environment in which the present invention may be implemented.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture-based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and point-in-time copy processing 896.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for point-in-time copy with target write optimization in a cascading copy-on-write process, comprising:
   in response to receiving, using a processor of a computer, a request to perform a point-in-time copy operation to create a point-in-time copy from a source volume to a target volume, creating an intermediate volume, an intermediate map, and a map for the target volume;
   making the intermediate volume dependent on the source volume in a dependency chain based on the intermediate map;

making the target volume dependent on the intermediate volume in the dependency chain based on the map for the target volume;

allocating a new stream identifier to the target volume, wherein stream identifiers represent dependent branches in cascading copy-on-write volumes, wherein the stream identifiers are provided in a bit vector and wherein inheriting a new stream identifier adds a stream identifier to the bit vector; and updating upstream volumes to inherit the new stream identifier as well as maintaining any existing stream identifiers.

2. The method as claimed in claim 1, wherein allocating a stream identifier to each volume in a chain enables the stream identifier to track a flow of Input/Outputs down the branches of a cascading copy-on-write process by identifying interlocking branches of the cascade.

3. The method as claimed in claim 1, including:
determining if there is an existing intermediate volume in the cascading copy-on-write process;
cleaning data on an existing intermediate volume to downstream volumes; and
removing an existing intermediate volume and its intermediate map.

4. The method as claimed in claim 1, wherein the intermediate volume is a thinly provisioned volume that cannot be accessed directly and acts as a staging buffer for copy-on-write data.

5. The method as claimed in claim 1, including carrying out a read operation to a volume in the cascading copy-on-write volumes;
determining the stream identifier of the volume being read and comparing the stream identifier to the stream identifier of each upstream volume,
wherein, if the upstream volume has a common stream identifier with the volume being read, including the upstream volume in the read operation.

6. The method as claimed in claim 1, including carrying out a write operation to a volume in the cascading copy-on-write volumes;
determining the stream identifier of the volume being written to and comparing the stream identifier to the stream identifier of each downstream volume,
wherein, if the downstream volume has a common stream identifier with the volume being written to, including the downstream volume in the write operation.

7. The method as claimed in claim 1, wherein the stream identifiers are prime numbers and wherein inheriting a new stream identifier multiplies the existing stream identifier by the prime number resulting in a common stream identifier having prime factors of the stream identifiers to which it belongs.

8. The method as claimed in claim 1, wherein the request to perform a point-in-time copy operation includes one of the group of types of: a snapshot copy, a clone copy, and a backup copy.

9. The method as claimed in claim 1, wherein the cascading copy-on-write process includes a mixture of types of point-in-time copy operations.

10. A system for point-in-time copy with target write optimization in a cascading copy-on-write process, comprising:
a processor and a memory configured to provide computer program instructions to the processor to execute the function of the components;
a point-in-time copy component for performing a point-in-time copy operation including:
a target component for creating a point-in-time copy from a source volume to a target volume;
a target component for creating a target volume;
an intermediate component for creating an intermediate volume;
an intermediate map component for creating an intermediate map; and
a map component for creating a map for the target volume,
wherein the intermediate volume is dependent on the source volume in a dependency chain based on the intermediate map, and the target volume is dependent on the intermediate volume in the dependency chain based on the map of the target volume;
the point-in-time copy component further including:
a stream identifier component for allocating a new stream identifier to the target volume, wherein stream identifiers represent dependent branches in cascading copy-on-write volumes, wherein the stream identifiers are provided in a bit vector and wherein inheriting a new stream identifier adds a stream identifier to the bit vector; and
an upstream updating component for updating upstream volumes to inherit the new stream identifier as well as maintaining any existing stream identifiers.

11. The system as claimed in claim 10, including:
a cleanup component cleaning up an existing intermediate volume in the cascading copy-on-write process, including:
a data moving component for cleaning data on an existing intermediate volume to downstream volumes; and
an intermediate volume removing component for removing an existing intermediate volume and its intermediate map.

12. The system as claimed in claim 10, wherein the intermediate volume is a thinly provisioned volume that cannot be accessed directly and acts as a staging buffer for copy-on-write data.

13. The system as claimed in claim 10, including a read operation component for carrying out a read operation to a volume in the cascading copy-on-write volumes, including:
a volume stream identifier component for determining the stream identifier of the volume being read and of upstream volumes;
a stream identifier comparing component for comparing the stream identifier of the volume being read to the stream identifier of each upstream volume; and
a reading component for including the upstream volume in the read operation if the upstream volume has a common stream identifier with the volume being read.

14. The system as claimed in claim 10, including a write operation component for carrying out a write operation to a volume in the cascading copy-on-write volumes, including:
a volume stream identifier component for determining the stream identifier of the volume being written to and of downstream volumes;
a stream identifier comparing component for comparing the stream identifier to the stream identifier of each downstream volume; and
a writing component for including the downstream volume in the write operation if the downstream volume has a common stream identifier with the volume being written to.

15. The system as claimed in claim 10, wherein the stream identifiers are prime numbers and wherein inheriting a new stream identifier multiplies the existing stream identifier by the prime number resulting in a common stream identifier having prime factors of the stream identifiers to which it belongs.

16. The system as claimed in claim 10, wherein the request to perform a point-in-time copy operation includes one of the group of types of: a snapshot copy, a clone copy, and a backup copy.

17. The system as claimed in claim 10, wherein the cascading copy-on-write process includes a mixture of types of point-in-time copy operations.

18. A computer program product for point-in-time copy with target write optimization in a cascading copy-on-write process, the computer program product comprising a computer readable storage medium having program instructions embodied therewith, the program instructions executable by a processor to cause the processor to:

in response to receiving a request to perform a point-in-time copy operation to create a point-in-time copy from a source volume to a target volume, create an intermediate volume, an intermediate map, and a map for the target volume;

make the intermediate volume dependent on the source volume in a dependency chain based on the intermediate map;

make the target volume dependent on the intermediate volume in the dependency chain based on the map for the target volume;

allocate a new stream identifier to the target volume, wherein stream identifiers represent dependent branches in cascading copy-on-write volumes, wherein the stream identifiers are provided in a bit vector and wherein inheriting a new stream identifier adds a stream identifier to the bit vector; and update upstream volumes to inherit the new stream identifier as well as maintaining any existing stream identifiers.

* * * * *